United States Patent
Broussard

(10) Patent No.: US 7,383,779 B2
(45) Date of Patent: Jun. 10, 2008

(54) RECYCLING SYSTEM AND METHOD

(75) Inventor: Hubert Michael Broussard, Houma, LA (US)

(73) Assignee: American Advanced Technologies, LLC, Houma, LA (US)

( * ) Notice: Subject to any disclaimer, the term of this patent is extended or adjusted under 35 U.S.C. 154(b) by 130 days.

(21) Appl. No.: 11/246,806

(22) Filed: Oct. 7, 2005

(65) Prior Publication Data
US 2007/0079738 A1   Apr. 12, 2007

(51) Int. Cl.
*F23G 5/00* (2006.01)
(52) U.S. Cl. .................. 110/346; 110/348; 110/204
(58) Field of Classification Search ............ 110/165 R, 110/166, 167, 168, 348, 235, 238, 346; 159/47.3; 210/768
See application file for complete search history.

(56) References Cited

U.S. PATENT DOCUMENTS

| 4,380,960 | A | * | 4/1983 | Dickinson | 110/347 |
| 4,571,175 | A | * | 2/1986 | Bogle et al. | 432/14 |
| 4,682,548 | A | * | 7/1987 | Peng | 110/222 |
| 4,917,027 | A | * | 4/1990 | Albertson et al. | 110/346 |
| 5,135,176 | A | * | 8/1992 | Barber | 241/23 |
| 5,632,211 | A | * | 5/1997 | Okuno et al. | 110/235 |
| 5,944,034 | A | * | 8/1999 | McRae et al. | 134/25.4 |

* cited by examiner

Primary Examiner—Kenneth B Rinehart
(74) Attorney, Agent, or Firm—Warner J. DeLaune

(57) ABSTRACT

A system and method of recycling non-hazardous waste materials is provided, wherein the method first comprises reducing the size of said non-hazardous waste materials. The method further includes incinerating the non-hazardous waste material within an incineration unit having at least one hearth and a flue gas stack, and transferring the non-hazardous waste liquids and the water to a storage tank. The method further comprises providing a clean water source to a steam generation unit, wherein the steam generation unit receives heated flue gas from the incineration unit, and operating the steam generation unit to produce steam. The steam is directed through one or more heating coils within the storage tank and transfers heat from the steam to the storage tank. Additionally, the non-hazardous waste liquids and water can be recirculated through an evaporator to progressively remove undesired substances from the non-hazardous waste liquid and water, and a first portion of the non-hazardous waste liquid and water can be redirected to the incineration unit to control temperature within the incineration unit. Finally, steam and undesired substances from the evaporator can be redirected to the flue gas stack to flash off undesired substances.

8 Claims, 2 Drawing Sheets

RECYCLING SYSTEM AND METHOD

BACKGROUND OF THE INVENTION

I. Field of the Invention

The present invention relates generally to systems and methods used to dispose of and/or recycle non-hazardous waste, such as engine oil filters and oil-absorbent pads, and more particularly to such systems and methods which result in minimum adverse impact on the environment.

II. Background and Prior Art

Disposal of used engine oil filters and oil-absorbent pads presents a serious environmental problem for a number of reasons. First, these products retain residual oil which can contaminate soil in landfills or the like. Used motor oil contains toxic heavy metals such as lead, chromium and cadmium, and dangerous organic chemicals. It is estimated that every year, more than 170 million gallons of used oil is improperly disposed of. Because sewage plants are not designed to deal with used motor oil, such oil often passes through storm sewers directly into rivers, wetlands and the ocean, posing a threat to aquatic life, as well as to the drinking water sources. Further, the oil filters contain materials of different types such as metal and paper-like filter material which cannot be readily decomposed or which are difficult to decompose. For these reasons, and because most of the used motor oil comes from disposal of used oil filters from automotive vehicles and industrial machinery, there has been ongoing research for ways to easily reclaim the oil in used oil filters, and to reclaim the metals and used filter elements therefrom.

One method involves gravity draining the filters to remove a large portion of the oil, and then melting down the filters and recasting the metal as reinforcing bar. However, this type of program makes no use of the used filter elements, does not remove enough of the oil before the filters are melted down, and is an expensive process.

Another means of recycling used oil filters simply involves crushing of the filters after the oil is drained. This presents the problem of fumes from the oil left in the filters when further recycling takes place, as does the melting and recasting process previously described. Thus, there remains a need in the art for a clean economical method of recycling used oil filters.

Consequently, an improved system and method of recycling such waste materials are needed. In such an improved system, used oil filters and oil absorbent pads (the "non-hazardous waste material") would be collected and dumped into a containment sump area. Any used oil and oily water in the waste material would be pumped out of the containment sump area to used oil storage tanks for recycling. A conveyor system in the containment sump area will take the solid waste material (metal housings and absorbent filter materials) to a sheer shredder (or "size reduction unit") to provide a reduced sized waste material for processing. The shredded waste material will be conveyed to a dual-batching system for loading into the incinerator (sometimes referred to as the "energy recovery unit" or "ERU"). When the waste material is loaded into the incinerator, the unit must have a controlled temperature such that the metal materials are not melted. Oily water from the bottom of the used oil storage tanks would be sprayed into the incinerator during the incineration process to assist in controlling the temperature inside the incinerator hearths. Oily water would also be routed to an evaporator unit for the production of steam as will be further described herein. The steam from the boiler and evaporator would be used to provide heat to the used oil storage tanks to aid in the oil/water separation within the tanks. Any condensate from steam used in connection with the storage tanks would be re-routed back to the boiler for further production of steam.

As will be further explained below in connection with the preferred embodiments, the use of a dual-hearth system inside the incinerator would provide a cleaner and easier way to remove the fly ash and clean metal without interrupting the operation of the incinerator process. A vacuum system would also be employed to vacuum the fly ash from the hearth and the metal hopper system. Also, an overhead crane magnet would remove the clean metal from the hearth and would deliver the clean metal into a scrap metal hopper. The hopper may include a vibrating conveyor which delivers the clean metal to a scrap metal container. Preferably, the vibrating conveyor would be hooded such that the vacuum system may also remove any additional fly ash at that stage of the process.

Fully and properly implemented, it is anticipated that such a system and method would result in an essentially "zero discharge", environmentally sound process, wherein the usable products are a non-hazardous fly ash (sellable as a stabilization material), a clean scrap metal (sellable as a #1 scrap metal), and used oil fuel (sellable to used oil bunker fuel market).

SUMMARY OF THE INVENTION

Therefore, one object of the present invention is to provide a recycling system for non-hazardous waste, such as oil filters and similar materials, which disposes of such waste in an environmentally safe manner.

It is also an object of the present invention to provide a recycling system for oil filters and similar materials which produces a saleable products from the recycling process, namely scrap metal, oil for fuel purposes, and fly ash.

A further object of the present invention is to provide a recycling system for non-hazardous waste which accomplishes essentially a zero discharge process.

Another object of the present invention is to provide a recycling system for non-hazardous waste which uses the heat energy generated by the incineration process to assist in the separation of oil from water.

Yet another object of the present invention is to provide a recycling system for non-hazardous waste which includes an evaporator to remove undesired water-based liquids through vaporization and transfer such liquids to be processed in the primary incinerator chamber.

Accordingly, a system for recycling non-hazardous waste, such as used oil filters and oil absorbent pads, is provided, comprising a non-hazardous waste material source including non-hazardous waste materials and water; a size reduction or shredder unit adapted to receive solid non-hazardous waste materials from the non-hazardous waste material source, wherein the shredder reduces the size of the solid non-hazardous waste material; an incineration unit capable of receiving the shredded solid non-hazardous waste material from the shredder unit, wherein said incineration unit is further capable of incinerating all non-metal materials; at least one storage tank for receiving non-hazardous liquids and water; a boiler, operatively connected between the incineration unit and the storage tank, for receiving water from an external clean water source and for receiving heated flue gas from the incineration unit, to produce steam; and one or more heating coils fluidically connected with the boiler and capable of transferring heat from the steam to the storage tank.

In a preferred embodiment, a portion of water in the storage tank is delivered to the incineration unit to assist in the control of temperature within the incineration unit. The incineration unit includes a removable tray for allowing extraction of unconsumed metal material. The system further includes a vacuum system for removing fly ash from the incineration unit.

The storage tank further includes a conduit system (piping) for removing non-hazardous liquids, such as oil, from the storage tank. Also, a magnet system is preferably employed for extracting unconsumed metal material from the dual-hearth system of the incineration unit.

Also provided is a method of recycling non-hazardous waste materials, comprising providing a non-hazardous waste material source including non-hazardous waste materials and water; shredding the non-hazardous waste materials from the non-hazardous waste material source, wherein the shredding step reduces the size of the waste material; incinerating the waste material within an incineration unit; pumping any non-hazardous liquids and water to a storage tank; providing a clean water source to a boiler, wherein the boiler receives heated flue gas from the incineration unit, and operating the boiler to produce steam; and directing the steam through one or more heating coils fluidically connected with the boiler and transferring heat from the steam to the storage tank.

DETAILED DESCRIPTION OF THE PREFERRED EMBODIMENTS

Figure 1A:
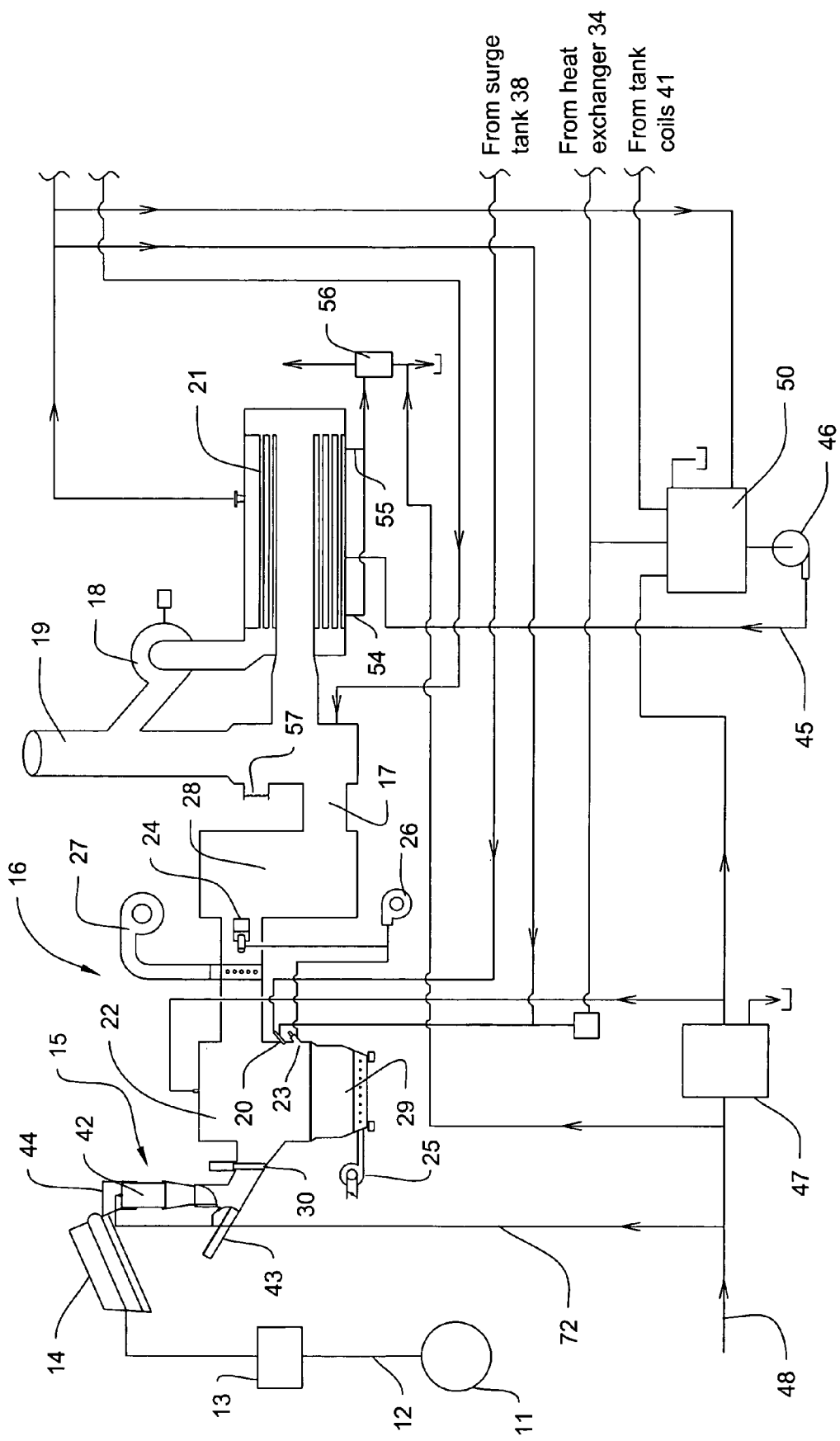
FIG. 1A depicts a general schematic diagram illustrating the major components of the incineration portion of a recycling system in accordance with a preferred embodiment of the present invention.
Figure 1B:
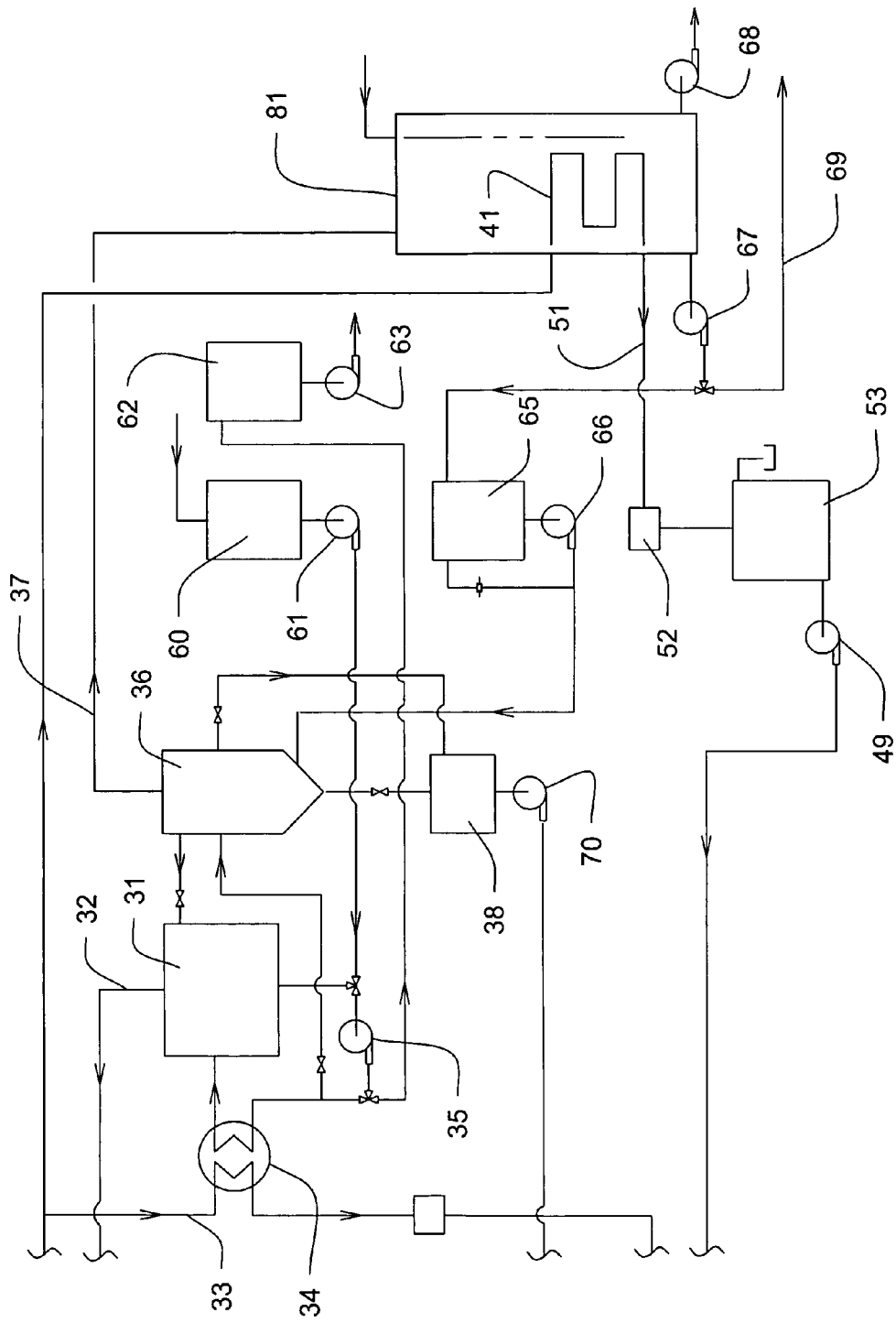
FIG. 1B depicts a continuation from FIG. 1A, including the evaporator and separator components of a preferred embodiment of the recycling system.

Turning now to FIGS. 1A and 1B, a preferred embodiment of a system for recycling non-hazardous waste is shown. In order to understand the system and the methods employed, the following general description is provided for a specific type of non-hazardous waste, namely used oil filters and oil-absorbent materials. As will become further apparent, the processes and equipment described may be used for recycling a wide range of non-hazardous waste in addition to the specific waste referenced below. For the purposes herein and unless otherwise specified, all references to "waste" shall mean "non-hazardous waste."

Used oil filters which contain paper filtration media and absorbent pads are collected within a sump area 11 containing water. Oil and water in the sump area 11 are pumped to processing tanks 81 located inside a tank battery near the rest of the recycling equipment. The solid materials are moved by a primary feed conveyor 12 toward a shredder (or "size reduction unit") 13 which reduces the size of the materials for more efficient processing. Shredded materials are then delivered by a secondary feed conveyor 14 to a dual-feed loading system 15 which regulates the flow of waste material into a dual-hearth incinerator unit (or "energy recovery unit") 16. When the term "conveyor system" is used herein, it shall be understood that any appropriate means of transferring such material may also be used with substantially equal effectiveness. The incinerator 16 provides a heat source for continuous incineration of the shredded oil filters and absorbent pads. In many respects, the incinerator 16 is the most important component in the recycling system, because it burns the waste material, i.e. oil filters, and provides heat for the boiler (as will be explained in further detail below) and also vaporizes the aromatic hydrocarbons present during the process. Although a variety of incinerators may be suitable to accomplish the objectives of the invention, the preferred incinerator is a PacTherm Model 2012 Incineration System.

Heat from the burning of such oil filters and pads (flue gas) is directed to a boiler 21 which produces steam to operate an evaporator 31 to strip other aromatic hydrocarbons from the waste water through vaporization. During this process, steam is also piped through coils 41 in the processing tanks 81 to elevate the waste oil temperature in order to assist in the separation of the oil from the water.

The steam provides heat to the forced circulation flash evaporator 31 which recirculates and heats a liquid waste feedstock containing water and undesirable dissolved gases, liquids, and non-hazardous substances at location 33. Optionally, the liquid waste feedstock 33 may be passed through a heat exchanger 34 prior to entry into the evaporator 31. The heated liquid feed stock 33 will flash to vapor substances which have a lower boiling point than water. The flashed off vapor consists of the "vapor phase byproduct other that water" and steam vapors at location 32. The liquid feed stock waste 33, recirculated by recirculating pump 35, increases in concentration as the separation of the vapor phase byproduct separates from the liquid waste feed stock. In connection therewith, a separator 36 provides for physical separation of the oil and water, where dewatered oil 37 is transferred to processing tanks 81, and contaminated water and sludge are transferred to a surge tank 38. Therefore, the two products produced by the combination of the incineration of the solid waste and the evaporation process are: (1) the vapor phase byproduct, and (2) the concentrated liquid feed stock. Oily water may be transferred from tanks 81 by pump 67 to either a disposal facility 69 or into an intermediate oily water surge tank 65. Oily water in the surge tank 65 can then be moved via pump 66 back to the separator 36 for further processing in accordance with the steps explained herein.

By coupling the flash evaporator 31 with the incinerator 16, the combined system provides a unique disposal method of the liquid waste by passing the vapor phase byproduct at the discharge 17 of the incinerator 16 past an induced draft fan 18 in the flue gas stack 19 exposing the vapor phase product gases to a temperature in excess of 800 F, reducing the gases in a contained and safe disposal method. Furthermore, the recirculating hot liquid feed stock can then be pumped from surge tank 38 using pump 70 into the incinerator 16 at injection point 20, where temperatures of approximately 2000 F cause the liquid and any contaminants to be effectively destroyed. This process reduces the exposure of gases to the atmosphere and provides a safe disposal process of the liquid byproducts and recovers some of the heat within the liquid byproducts.

Consequently, the advantages of the system are several. First, the vapor phase byproduct gases are completely contained in a gas-tight environment and mixed with 800 F plus hot oxygen-rich gas and reduced to a safe and acceptable stack gas. Second, the concentrated liquid feedstock has been stripped of undesirable volatile liquids in the form of gases and the feedstock is concentrated to such an extent that the liquid has significant heating value which can be realized in the incineration process. The concentrated liquid can be safely burned at injection point 20 in the semi-open primary incineration chamber 22 without environmentally sensitive or undesired gas release. Finally, the concentrated feedstock may also be a recoverable product such as glycol, antifreeze, coolant, oil, or similar products which can be removed from tanks 81 via pump 68. Moreover, in alternative applications outside the scope of oil filters, such as in the municipal and industrial waste sectors, the concentrated feedstock may also be a non-recoverable waste such as human waste, sewer emergency release waste from failed municipal systems, portable toilet waste, recreation vehicle waste, marine waste, pathogenic waste, and many other forms of waste material.

Incinerator Control

With regard to incinerator burner startup on the PacTherm Model 2012 Incineration System, the incinerator 16 has one primary burner 23 and one secondary burner 24. Both burners 23, 24 have adjustable bypass pilot gas flows and UV sensors that sense pilot and main gas flames. Usual and customary gas pressure interlocks are in place on the gas train and an air pressure switch on the burner blower exit duct must prove before the secondary burner pilot can start. Pushing an "Incinerator Start" button causes all incinerator blowers 25, 26, 27 to operate during the timed purge cycle before the burner start sequence. Immediately following the purge period the secondary burner spark igniter starts and the pilot gas solenoid valve opens. After the secondary burner pilot flame is proved the main gas valves open and the secondary burner 24 starts at full fire. At the same time, bypass pilot gas flows to the primary burner 23. After the pilot flame is proved, the primary burner gas valve opens and the primary burner 23 starts at full fire.

With respect to burner modulation, a motorized valve, which receives a milliamp signal from the secondary chamber temperature controller (TIC-2) modulates the secondary burner 24 fuel flow, while burner air flow 26 stays constant at a rate to match full burner capacity of 5 MMBtu/hr. The secondary burner 24 fuel modulating valve will reduce the firing rate as combustion of waste increases, and works inversely with the main combustion air supply to maintain the secondary chamber 28 temperature set point as the waste heat release rate fluctuates. Typically, the motorized valve is set to be fully open at a signal of 20 ma and proportionally closed to a minimum position at a signal of 12 ma. The gas modulating valve minimum flow is set so that there is a small flame maintained in the secondary burner 24, thus allowing the main fuel valves to stay open and the primary burner 23 to function independently. The primary burner fuel flow is modulated by a proportional gas regulator which receives an air pressure signal from the primary burner air supply, which is modulated a motorized valve which receives a 4 to 20 ma signal from the primary temperature controller (TIC-1).

With respect to air modulation, secondary burner air is fixed and primary burner air is modulated, as described above. A motorized valve on the main blower inlet, which also receives a signal from TIC-2, controls the main incinerator combustion air 27, which enters into the duct between the primary and secondary chamber. The valve is fully closed at 20 ma and fully open at 4 ma. In this way the secondary burner fuel flow and the main combustion air flow are coordinated to control secondary chamber temperature so that as the heat release rate of the waste increases, burner fuel is progressively decreased to minimum flow while the main combustion air is progressively increased up to about half of full flow. At higher waste heat release rates secondary chamber temperature is controlled by modulating combustion air only, while the burner is on standby at minimum flow.

Primary chamber (underfire) air 25 is controlled by a motorized valve, which receives the same signal from TIC-2 but operates inversely to the main air valve. The valve linkage is set so that there is very little modulation of underfire air 25 except when the incinerator 16 is approaching its maximum rate of heat release and maximum main air flow. At this condition the underfire air 25 is being reduced at a steep rate which has the effect of modulating waste heat release and preventing over-firing of the incinerator 16. When the incinerator system controls are fully harmonized, the main air modulation and the underfire air modulation work together to maintain the incinerator heat release near its rated value while minimizing burner fuel consumption. Underfire air modulation is not used to control primary chamber 22 temperature. Rather, the only function of the underfire air modulation is to help control waste burning rate.

As described above, the secondary chamber temperature controller (TIC-2) maintains the secondary chamber 28 temperature near set point (1800 F), over the full range of waste burning rates, by modulating the main combustion air flow 27, the secondary burner 24 firing rate and the underfire air flow 25. All three motorized valves share the same 4 to 20 ma signal loop. TIC-2 also has auxiliary outputs that signal at the main control panel when the temperature is too high above set point and will delay further automatic waste charging cycles until the burning rate has returned to normal.

As described above, the primary chamber 22 temperature controller (TIC-1) maintains the primary chamber 22 minimum temperature by modulating the primary burner 23 fuel and air flow. An auxiliary output is used for high temperature limit control by energizing a solenoid valve for water spray from the separation tank 36 into the primary chamber 22 at injection point 20. The controller is also used to set low and high temperature limits for operation of the waste loaders and for additionally injecting liquid sludge into the primary chamber 22, such as that from the evaporator 31. When any pre-set minimum temperatures have been reached in the primary chamber 22 or secondary chamber 28, the incinerator is ready for charging with the oil filter and pad waste materials to be incinerated.

Incinerator Loading of Non-Hazardous Waste Materials

The incinerator 16 has dual automatic loaders 15 that receive shredded material from the conveying/shredding system 13 and operate in alternating cycles. The loaders 15 are arranged side by side with their injection chutes inclined to aid in distribution of waste into the hearths 29. Each loader chute 15 has two doors, namely the vertical fire door and the pre-load hopper door 30, that constitute an incinerator air lock since the doors are never open at the same time. The volume between the loader chute doors has a pressure release door, which opens to the area above the loader ram 43, in the event of flammable vapor ignition in the loader chute 15. To help suppress any fires or vapor ignitions in the loader chute, there are dual UV flame sensors and three water spray nozzles in each loader chute 15 that operate automatically whenever the firedoor is not closed and also at any other time that flame is detected in the chute. Flame detection and spray operation are indicated on the control panels. A water pressure switch on each loader detects any low pressure at the spray nozzles, when the solenoid valve is open, and alarms at the control panels.

Above the loader chute 15 is the pre-load hopper 42 in which waste from the conveyor is accumulated on top of the closed hopper bottom door until it reaches a pre-set level. The pre-load hoppers each have a UV flame sensor and two spray nozzles that activate automatically, and alarm at the control panels, if any flame is sensed.

Above the two pre-load hoppers is a material diverter 44 that alternately feeds the two hoppers. When one hopper is full the diverter 44 shifts to the other hopper without interrupting the material feed conveyor. If both hoppers are full at the same time the conveyor permissive signal is interrupted and the conveying system is temporarily stopped (with the exception of the shredder) until one of the loaders discharges its hopper into the incinerator.

The loading system must have a permissive signal from the incinerator before it can be operated automatically. Compressed air system pressure must be at least 90 psi (PS-25) and water supply pressure to the loaders should be at least 30 psi. After the incinerator 16 has been started and has reached minimum charging temperature, and the operator has determined that all systems are safely operational, the hydraulic power unit is switched to "Auto" and the "Conveyor Enable" button is depressed on the loader system local panel. ("Conveyor Enabled" light on).

After the conveying system 14 starts to deliver waste it will accumulate in one of the two pre-load hoppers. When the high waste level is detected the conveyor feed will be automatically diverted to the other hopper. If the load interval timer has timed out the first loader will cycle automatically. First, the hydraulic power unit is activated. Immediately after startup of the power unit the pre-load hopper door opens (with air cylinders), dropping the waste into the loader chute. After a 3-second delay for the door to fully open and the waste to drop, the pre-load hopper door closes. After the pre-load hopper door fully closes (LS-15 or 26) the fire door immediately opens, the chute water spray 72 simultaneously comes on and the loading interval timer is reset. When the fire door is fully open (LS-16 or 27), the loading ram 43 immediately moves forward full stroke, projecting the waste charge onto the hearth 29. After making a full stroke (LS-16 or 29), the loading ram 43 immediately retracts. When the loading ram 43 is fully retracted (LS-19 or 30), the fire door immediately closes, and when fully closed (LS-17 or 28) the water spray 72 stops and the hydraulic power unit shuts off. If flame is still detected after the fire door has closed, the water spray 72 will stay on until it is extinguished.

If the loading cycle is not completed in a pre-set time interval (e.g. 20 seconds) it may indicate a problem, and a malfunction light will indicate on the control panels, as well as an audible alarm. After making sure that all personnel are safely clear of both loaders, the loaders may be operated manually from the local loader control panel if necessary to clear any malfunctions.

The material diverter 44 directs flow from the feed conveyor, filling one pre-load hopper then automatically diverting flow into the other per-load hopper. When the second pre-load hopper has been filled the diverter 44 switches back to the first hopper. If the first pre-load hopper has been previously discharged, it will be filled again and the alternate feeding will continue until the conveyor feed rate overcomes the loader feed rate. At that time the feed conveyor 14 will be automatically stopped and then restarted as soon as one of the pre-load hoppers has discharged.

If at any time the diverter air-cylinder actuator is not able to complete the flow-switching action within a pre-set time interval (e.g. 4 seconds) there may be a malfunction. At this time an alarm will indicate at the control panels and the feed conveyor 14 will be stopped. Before operating the diverter 44 manually it should be inspected to determine if it has been jammed by material or if there is some other visible cause of the malfunction. The diverter 44 can be moved manually, by moving the cylinder linkage, to establish free movement. The air valves can then be returned to their normal positions and the diverter 44 operated manually from the loader control panel to test for normal action.

Incinerator Operating Cycle

With the incinerator material feed and loading system operating normally, the loaders 15 will continue to automatically cycle, alternately, with material charges being injected at pre-set time intervals, typically 8 to 10 minutes.

Effects of material heating value on loading interval will now be described. The incinerator controls are normally able to accommodate a variable range of non-hazardous waste types and heating values without operator intervention. When the non-hazardous waste stream is relatively consistent the loading intervals can be adjusted to maximize throughput and minimize auxiliary fuel use. If the average non-hazardous waste heating value is relatively high, the incinerator heat release capacity may be occasionally reached and the loading intervals will be automatically extended to compensate temporarily. If the average non-hazardous waste heating value is relatively low, more auxiliary fuel will be required to maintain secondary chamber temperatures. As persons of ordinary skill in the art will understand, the optimum loading interval will usually be determined after the full nature of the particular non-hazardous waste has been determined in operation.

After the incinerator 16 has been charged for an extended period, the unburnable components in the non-hazardous waste will be seen to accumulate on the hearth 29. The charging period will be limited by the depth of unburnable residue, which should not be allowed to rise above the top of the walls of the moveable hearth 29. If the residue were allowed to accumulate to an uncontrolled depth it would eventually make the hearth 29 impossible to retract and require extensive cooling and difficult manual labor to correct.

Depending on the charging rate and the unburnable content, the operator will need to inspect the residue depth, at regular intervals, through the viewports at each end of the hearth. The operator will gain from experience with various specific non-hazardous wastes how much hearth build-up is practical and how much the residue will be reduced during the burndown period after charging has stopped. When the operator judges that the hearth 29 has reached its capacity, he must then stop the loading process by pressing the "Loading Cycle End" button on the local loader panel. ("Burndown" light on main panel is activated.)

The incinerator 16 will stay in the burndown condition for a pre-set time to allow the last charges of non-hazardous waste to be burned to a practical point where most of the organic material has been consumed. At the end of the burndown period, the residue must be cooled somewhat to reduce possible hazards when retracting the hearth 29. ("Cooldown" light is activated.)

Operating experience will determine the nature and extent of the cooldown process. The underfire air system 25 and the temperature control water spray 20 may be programmed in a manner understood to those in the art to find the most practical cooling process for the operating parameters in day to day use.

At the end of the cooling cycle, all incinerator components are off ("Shutdown" light is on) and the hearth 29 should be ready for retraction and emptying. The operator should visually check the hearth 29 through the available viewports to confirm no residual flame or smoke is present.

Hearth Operation

After the residue on the hearth 29 has been cooled to the point that there is no flame or appreciable smoke remaining, the hearth 29 can be fully retracted from the primary chamber 22. The operator should check to see that there are no obstructions on the hearth track and all personnel are clear over the full length of the hearth track before moving the hearths 29. At the loader system local panel, the "Hydraulic Pump" switch is turned to "On". At the local Hearth Positioning panel, the "Seal Actuation" switch is turned to "Open". This opens the hearth end seals and also retracts the primary chamber air duct 25 from the side of the hearth 29.

Pushbuttons "Move Left" or "Move Right" are selectively depressed to cause the hydraulic drive to move the hearth 29 in the desired direction. Releasing the pushbutton will allow the hearth 29 to stop. Normally the pushbutton will be held in until the hearth 29 reaches the end of its travel and the alternate hearth 29 is in position at the primary chamber 22. The operator visually verifies that the alternate hearth 29 is properly positioned with the fixed part of the primary chamber 22, then moves the "Seal Actuation" switch to "Close" which re-seats the hearth end seals and re-connects the primary chamber air duct 25 to the hearth 29. Finally, the "Hydraulic Pump" selector switch is returned to "Auto". The retracted hearth 29 is now ready to be further cooled, if necessary, and emptied of residue. The alternate hearth 29 is then ready for incinerator restart.

While the hearth 29 is in a retracted position, an overhead crane magnet is used to remove the unconsumed metal material from the hearth 29 and deliver the metal onto a vibrating tray or conveyor. The vibrating tray or conveyor is preferably employed prior to delivering the scrap metal to the hopper, because the vibratory action helps to separate residual fly ash and dust from the metal, with the dust and fly ash falling below the conveyor into a collection receptacle. Preferably, the vibrating conveyor is hooded such that a vacuum system may also remove any additional fly ash at that stage of the process.

Energy Recovery Boiler Operation

The energy recovery steam generation unit system (or "boiler system") 21 is designed to recover heat from the incinerator flue gases and produce saturated steam at 10 to 12 psi. The quantity of steam will match the demands of the waste oil heating system 41, the evaporator system 31 and the evaporator sludge atomizer 20 up to a maximum capacity of about 25,000 lb/hr. At conditions of reduced demand, a fraction of the flue gases are pulled through the boiler 21 as necessary to maintain boiler pressure. At all times the flue gas flow through the boiler 21 is regulated by the variable speed I.D. fan 18. The fan's VFD, located in the control room, receives a control signal from a boiler pressure controller (PIC-2). Any fault in the boiler 21 or feedwater systems will cause the I.D. fan 18 to stop and all flue gas flow to divert from the boiler 21 to the stack 19.

Before placing the boiler 21 in full operation, it is first prepared according to the boiler manufacturer's instructions which may include a boil-out procedure. Prior to normal operation the proper condition and operation of all components and control elements is verified. Normal startup proceeds as follows. The operator verifies that the incinerator system 16 is operating normally and with a clear stack 19, and that normal water levels are present in the boiler 21 and feedwater tank 46, and that the water softener 47 is on line, and that service water 48 (makeup water) is available. Power disconnects are closed at the I.D. fan 18, feedwater pump 46 and the condensate transfer pump 49. At the main control panel, the "I.D. Fan Enable" selector switch is moved to "On", and the selector switch is on "Auto" on the I.D. fan inverter panel. At the local Boiler System panel, the "Feedwater Pump" selector switch is moved to "Auto" and the "I.D. Fan Start" button is depressed.

The energy recovery system will now be in automatic operation and will continue until shut down manually or by a system fault or plant power failure. System faults that will cause shutdown are: (a) high boiler inlet temperature, (b) high exit (I.D. fan inlet) temperature, (c) high boiler pressure, (d) low boiler water level, or (e) feedwater pump motor failure.

Boiler Feedwater System

A feedwater tank 50 receives all of the condensate 51 returned from the heating coils 41 on the oil/water separation tanks 81. The condensate 51 will drain from the coils 41 through a trap 52 into a small receiving tank 53 and be periodically pumped back to the feedwater tank 50 by a level-switch controlled transfer pump 49. If the return of condensate 51 is interrupted too long and the feedwater tank level falls below midpoint, an internal float valve will open to allow inflow of makeup water from the softener 47. If the feedwater tank level falls to a low point, an alarm will indicate on the local boiler panel and the main control panel. Feedwater temperature is maintained above 180 F by the inflow of boiler steam through temperature control valve and a sparger pipe.

The boiler feedwater pump 46 is located beneath the feedwater tank 50 and is controlled at a local panel. The pump 46 runs continuously and flow is regulated by a modulating valve mounted at the boiler 21. To prevent overheating of the pump 46 at very low feedwater flows, a small portion of the pump discharge flows back to the feedwater tank 50 through a limiting orifice.

Depending on boiler water quality and the amount of makeup water needed, it will be necessary to periodically drain off water from the bottom of the boiler 21 to limit the concentration of dissolved solids in the boiler water. Periodic testing of the boiler water will indicate how much boiler blowdown is needed.

The boiler has quick-opening valves at each end 54, 55. When blowdown is needed these valves are opened quickly to allow a large flow volume for a short time. The large flow volume is intended to pick up and discharge any sludge that may have settled to the bottom of the boiler drum. The blowdown water passes through the blowdown separator 56 and as the pressure falls to atmospheric pressure, a portion of the water will flash into steam. The water, then at 212 F, is centrifugally separated from the steam and flows out of the bottom of the separator 56 while the steam is vented out the top and out of the building. Since the water is too hot to enter the drain system, it is first diluted with cold water to a safe temperature of about 120 F.

Incinerator Draft Control

The incinerator draft (small negative pressure) is primarily a function of stack temperature and height. A consistent draft is needed to cause all of the flue gases to leave the incinerator 16 through the flue ports and not leak out through structural joints or through clearance gaps in the dual-feed loaders 15.

During normal operation the fraction of incinerator flue gases that are pulled through the boiler 21 will fluctuate, which will result in fluctuations in stack temperature and exit velocity. At the same time the flow of flue gases through the incinerator chambers 22, 28 and ducts will also be fluctuating as a result of waste charging cycles and variable rates of heat release. All of these conditions have a direct effect on draft in the incinerator primary chamber 22.

To maintain control of primary chamber 22 temperatures and minimize entrainment of fly ash, it is important to maintain incinerator draft at consistently low values, preferably between about −0.05" to −0.20" water gauge (w.g.). To effect this control a dilution air damper 57 is located in the upper part of the stack base. To decrease draft, the damper 57 proportionally opens to allow cold air into the stack 19 which reduces available draft by lowering stack temperature and increasing draft losses due to flow friction and exit velocity losses. Fully closing the damper 57 results in the maximum draft for any operating condition. The damper actuating motor receives a 4-20 ma signal from the draft controller (PIC-1) on the main control panel.

Non-Hazardous Waste Feed System Operation

The non-hazardous waste feed system generally comprises the following components: (1) a receiving hopper/conveyor 11, (2) a primary feed conveyor 12, (3) a shredder 13, and (4) a secondary feed conveyor 14.

The receiving hopper has an inclined discharge conveyor 11 that discharges onto the primary feed conveyor 12. The primary feed conveyor speed is set with a VFD control located in the control room. Operation of the inclined discharge conveyor 11 is controlled from either of two local pushbutton stations, one on each side of the hopper, accessible at floor level. To run the inclined discharge conveyor 11, a permissive signal is required from the primary feed conveyor 12.

The primary feed conveyor 12 is also inclined and carries the solid material from the inclined discharge conveyor 11 to the shredder 13. It is controlled by either of two stations which are accessible at two waste-picking locations. The primary feed conveyor 12 requires a permissive signal from the shredder 13 and from the secondary feed conveyor 14. The shredder 13 is controlled independently at a local panel. Once started it will continue in normal operation until stopped by a shredder fault on turned off by the operator.

The secondary feed conveyor 14 is inclined and takes the shredded waste to the top of the waste charging system and discharges into the material diverter 44. It is controlled by either of two local pushbutton stations, one accessible from floor level and the other at the upper loader platform. The secondary feed conveyor 14 requires a permissive signal from the loader system local panel.

In normal operation the entire conveyor system will run continuously if the conveyor volume feed rate is less than the loader volume feed rate. If the secondary conveyor feed rate is set too high, relative to the loader feed rate, the conveying system will be periodically halted until a loader 15 is ready for more material, and then automatically restarted. The primary feed conveyor 12 may be stopped and started at any time by the pickers, as necessary. This action will affect the inclined discharge conveyor 11 but not the primary feed conveyor 12 or the secondary feed conveyor 14. The operation of the conveying system is monitored by status lights on the main control panel.

Non-Hazardous Waste Water Injector Operation

A liquid non-hazardous waste injector 20 is located in the incinerator primary chamber 22 immediately above the primary burner 23. The injector system 20 is designed to inject random mixtures of water and oil pumped from the evaporator 31, at a pre-set rate, contingent with a permissive signal from the incinerator controls. The incinerator 16 will accept liquid non-hazardous waste under the following conditions: (a) the incinerator burn cycle is in "Normal" phase and the Waste Water Injection selector switch is set to "Auto"; (2) primary chamber temperature is between pre-set temperatures, for example, between 1200 F and 1700 F; (3) secondary chamber temperature is not above the high temperature alarm point; and (4) the atomization steam (or compressed air) pressure (PS-10) is not below 30 psi after the waste liquid valve (Sol-10) and either the atomizing steam valve (Sol-12) or compressed air valve (Sol-11) has opened. The pressure switch signal allows three (3) seconds for pressure buildup after the solenoid valves have opened.

When all of the above conditions are met, a permissive signal is sent to the waste water feed pump controls located at the evaporator 31. If the waste water feed is interrupted because incinerator temperatures are out of permissible range, the feed will restart automatically when temperatures are restored to normal. If waste feed is shut off because of low atomizing fluid pressure, the cause of low pressure would need to be corrected and the system reset with the reset button on the Loader System Local Control Panel.

It will be appreciated that a wide range of additional liquid waste products may be processed through the recycling system, as illustrated in FIG. 1B with respect to the optional glycol processing components. For example, a diluted glycol/water receiving tank 60 may be positioned near the evaporator 31, and the glycol/water liquid can be transferred by pump 61, and then separated and recirculated in the manner described earlier herein. It should be noted that such processing may occur concurrently with any other liquid waste processing (such as used oil) occurring within the recycling system. Once a more concentrated glycol/water mixture is achieved after such processing, the resultant product can be transferred to a holding tank 62 and sent via pump 63 to a storage tank or other holding vessel.

Although exemplary embodiments of the present invention have been shown and described, many changes, modifications, and substitutions may be made by one having ordinary skill in the art without necessarily departing from the spirit and scope of the invention.

I claim:
1. A method of recycling non-hazardous waste materials, comprising:
 (a) providing a material source including said non-hazardous waste materials containing non-hazardous waste liquids and water;
 (b) reducing the size of said non-hazardous waste materials from said material source;
 (c) incinerating said non-hazardous waste material within an incineration unit having at least one hearth and a flue gas stack;

(d) recirculating said non-hazardous waste liquids and said water through an evaporator to progressively remove undesired substances from said non-hazardous waste liquid and said water;

(e) redirecting a portion of said non-hazardous waste liquid and said water to said incineration unit to control temperature within said incineration unit; and (f) redirecting a portion of steam and said undesired substances from said evaporator to said flue gas stack to flash off said undesired substances.

2. The method of claim 1, wherein said non-hazardous waste materials are used oil filters.

3. The method of claim 1, wherein said non-hazardous waste materials are oil absorbent pads.

4. The method of claim 1, further comprising the step of extracting unconsumed metal material from said hearth.

5. The method of claim 1, further comprising the step of removing fly ash from said hearth.

6. The method of claim 1, wherein said non-hazardous waste liquids comprise lubricating oil.

7. The method of claim 1, wherein said non-hazardous waste liquids comprise glycol.

8. The method of claim 1, wherein said progressive removal of undesired substances from said non-hazardous waste liquid and said water produces a recycled liquid, and wherein said recycled liquid is transferred to a storage tank.

* * * * *